(12) United States Patent
Lemaire et al.

(10) Patent No.: US 8,189,612 B2
(45) Date of Patent: May 29, 2012

(54) SYSTEM ON CHIP WITH INTERFACE AND PROCESSING UNIT CONFIGURATIONS PROVIDED BY A CONFIGURATION SERVER

(75) Inventors: Romain Lemaire, Seyssinet-Pariset (FR); Didier Lattard, Rencurel (FR); Fabien Clermidy, Saint-Egreve (FR); Christian Bernard, Saint Etienne de Crossey (FR)

(73) Assignee: Commissariat a l'Energie Atomique, Paris (FR)

( * ) Notice: Subject to any disclaimer, the term of this patent is extended or adjusted under 35 U.S.C. 154(b) by 276 days.

(21) Appl. No.: 11/686,579

(22) Filed: Mar. 15, 2007

(65) Prior Publication Data

US 2007/0217439 A1    Sep. 20, 2007

(30) Foreign Application Priority Data

Mar. 16, 2006  (FR) ...................................... 06 50892

(51) Int. Cl.
*H04L 12/00* (2006.01)
(52) U.S. Cl. ....................................................... 370/463
(58) Field of Classification Search .................. 370/252, 370/419, 463
See application file for complete search history.

(56) References Cited

U.S. PATENT DOCUMENTS

| | | | |
|---|---|---|---|
| 6,873,602 B1 * | 3/2005 | Ambe | 370/254 |
| 7,295,552 B1 * | 11/2007 | Kadambi et al. | 370/392 |
| 2004/0184470 A1 * | 9/2004 | Holden | 370/412 |
| 2005/0021871 A1 * | 1/2005 | Georgiou et al. | 709/250 |
| 2005/0125568 A1 * | 6/2005 | Yeo et al. | 710/3 |
| 2006/0041889 A1 * | 2/2006 | Radulescu et al. | 719/313 |

OTHER PUBLICATIONS

F. Clermidy, D. Varreau, D. Lattard; "A NoC-based communication framework for seamless IP integration in complex systems"; IP/SOC 2005, Dec. 7, 20005.
K. Chan et al.; "COPS Usage for Policy Provisioning (COPS-PR)"; IETF Standard, Internet Engineering Task Force, IETF; Mar. 2001.
Radulescu A et al.; "Communication services for networks on chip"; Proceedings of the International Workshop on Systems, Architectures, Modeling and Simulation; vol. 2, 2002, pp. 275-299.

* cited by examiner

*Primary Examiner* — Huy Vu
*Assistant Examiner* — Benjamin Lamont
(74) *Attorney, Agent, or Firm* — Pearne & Gordon LLP

(57) ABSTRACT

This invention relates to a system on chip for data flow type application. The system comprises a network on chip, a central controller and processing units connected to said network via associated network interfaces. A processing unit and/or its associated network interface can be configured on command from the central controller or on a command incorporated in a data packet to be processed. The network interface comprises a client module that can request a configuration server to transmit the parameters of a configuration that is unavailable in the interface. The invention also relates to a mobile terminal/ a base station comprising a base band modem implemented by such a system on chip.

10 Claims, 7 Drawing Sheets

SYSTEM ON CHIP WITH INTERFACE AND PROCESSING UNIT CONFIGURATIONS PROVIDED BY A CONFIGURATION SERVER

DESCRIPTION

1. Technical Field

This invention relates to the field of systems on chip, or SoC, using a network on chip, or NoC, especially for an implantation such as radio software for a base band modem.

2. State of the Prior Art

The state of the art is known for a technique of using a system on chip (SoC) to process data flow type applications. In such an application, various processing units created on a same substrate and connected to one another by means of a network on chip (NoC), carry out various processing operations on the data. The data flow passes from one processing unit to another, eventually dividing into several flows which can later merge again. After a processing operation in a unit, typically a calculation or formatting, the data processed are transmitted to another unit or a plurality of other units via the network for further processing operations. The data are transmitted from one unit to another in the form of packets, each packet comprising a routing header that allows the packet to be routed through the network to the destination unit and a payload comprising the data itself. The packets are switched for example using a wormhole routing mechanism, that is itself known.

FIG. 1 shows diagrammatically an example of a system on chip for a data flow type application, known from the state of the art.

The system on chip 100 comprises on the one hand a network on chip and on the other hand processing units 130 that are interfaced with the network by means of network interfaces 140. The network on chip, here with regular two dimensional mesh, is composed of routers 120 located on interconnection nodes connected to one another by means of physical links 125. In general, the topology and the dimension of the network may take any form.

The network interfaces form an essential part of the system on chip: they permit communications at the processing units to be disregarded. The role of a network interface is to manage locally the communications entering and leaving the processing unit so that, viewed by the latter, this proceeds as if the connections with the other processing units were of the point to point type. The network interfaces allow the processing units to communicate in spite of their disparity. Furthermore, the network interfaces may be connected to one or more network nodes. There is an illustration in 145 of an interface connected to two adjacent nodes.

The processing units may be dedicated to a task or may be generic (CPU, RAM, etc.). Those which are dedicated often have proprietary architecture and specific input/output interfaces. Furthermore, the processing units can generally be configured so that they can operate in different operating modes.

The running of an application by a system on chip requires the cooperation of the various processing units. This cooperation is generally organised and synchronised by a central controller, 110. This controller monitors the progress of the data flow through the network. It sends data reception orders, processing and then data emission to the various processing units via their associated network interfaces. At each step of the processing, the units report to the central controller on their respective activities, for example via an interruption mechanism. The controller then takes decisions on the subsequent actions to be taken by the processing unit(s).

This type of centralised mode operation is simple to implement but not very efficient in terms of latency. In fact, the central controller is constantly interrupted and the data flow flows intermittently. In addition, it does not permit easy scalability when the number of processing units increases.

Other types of operation with a more distributed mode are known in the state of the art. In particular, proposed in the article by F. Clermidy and al. entitled "A NoC based communication framework for seamless integration in complex systems", IP-SOC 2005 as well as in the unpublished patent application FR0452182, filed in the name of the current applicant, a semi-distributed control in which a central controller is responsible for the overall control of the application and the network interfaces of its close control at local level.

More precisely, the central controller supplies each pair of associated network and processing unit interfaces with a configuration or a sequence of configurations to be adopted to run a task. Each configuration is described by a configuration content, that is to say a set of configuration parameter values stored in the network interface, wherein each configuration content defines a communication configuration of the interface and/or an operating configuration of the processing unit. A local controller provided in the network interface makes this interface and/or the associated processing unit adopt the configuration or the series of configurations supplied by the central controller. When the task has been run, a new task may be provided by the central controller to the network interface/ processing unit pair.

FIG. 3 describes diagrammatically the operation of a system on chip using the semi-distributed control previously mentioned. For reasons of simplification, a single network interface 340 has been shown and the associated processing unit has been omitted. The network interface 340 comprises a local controller 370 and a management configuration unit 360 for managing the configurations. We suppose that the central controller 310 has previously supplied the network interface 340, for example during an initialisation step, with all of the configuration contents concerning the interface and/or the processing unit in question. These configuration contents are stored in the memory of the management configuration unit 360. Dynamic reconfiguration of the interface and/or the processing unit may be made using one of the two following modes:

(a) either the central controller indicates to the network interface, by means of an explicit command message 315, the configuration or sequence of configurations to be adopted. This mode is particularly used to configure the reception of the data at the network interface;

(b) or a data packet received by the interface contains in its header a label 325 indicating that a specific configuration or a sequence of configurations must be adopted to process the data of said packet. This mode, called incorporated command mode, is especially used to configure the emission of the data by the network interface and the processing of the data by the processing unit.

After processing, an interruption 345 is transmitted to the central controller 310.

FIG. 2 shows in greater detail the structure of a network interface 240, associated to a processing unit 230. Hereunder, the network interface and associated processing unit pair will be designated more simply by the term "resource".

The interface comprises an input port 241 and an output port 242. The input port 241 can receive and identify the data packets sent from the network as well as direct them to the destination units in the interface. In return, the output port 242 is capable of judging the emission requests from emitting units in the interface and of transmitting the data packets issued from these units on the network.

In general, the interface may comprise several input and/or output ports, which will be the case if the interface is connected to several network nodes, as we saw earlier.

The data exchanged between the network interface 240 and the processing unit 230 passes via buffers 281 and 282, which are in the form of memories with shared access between the interface 240 and the processing unit 230. The data from the interface is written in the buffers 281 and read by the processing unit 230. The data from the processing unit 230 is written in the buffer 282 and read by the interface. In general, the number of buffers matches the number of input/output ports of the processing unit.

The network interface comprises an input communication controller 251 (also called ICC) and an output communication controller 252 (also called OCC).

The input communication controller 251 manages the flow of packets destined for the processing unit using a credit management mechanism. To do so, it controls the filling of the buffers 281. These buffers receive, via the port 241, data from the resources of the emitting system destined for the interface 240. Depending on the available space in these buffers (or even their respective fill rates), the communication controller 251 grants "credits" to the various emitting resources, a credit indicates to an emitting resource the quantity of data that it can transmit to the interface 240. The credits are attributed by means of specific messages transmitted by the input communication controller 251 to the emitting resources.

In FIG. 2, we have symbolically shown by a thin dotted line the transmission of the credits. The communication controller 251 updates a table of the credits already allocated to each of these resources, wherein the total amount of the credits that it can attribute to an emitting resource is fixed by the content of the configuration that is imposed on it.

The output communication controller 252 manages the flow of packets from the processing unit 230. To do so, it controls the emptying of one or more buffers 282 (in the case shown, a single buffer is present) in which is stored the data from the processing unit. Moreover, the communication controller 252 receives the credits attributed by the various destination resources and empties the buffer(s) 282 within the limit of the attributed credits. The communication controller 252 updates a table of the credits consumed for each of these resources. When, for a given resource, the amount of the credit consumed reaches that of the credit attributed, the emptying of the buffer is stopped.

The communication controllers 251 and 252 may be composed of elementary controllers each having the control of a buffer 281 or 282.

The network interface 240 optionally comprises a processing unit controller 253. This controller may be integrated into the interface, shared between the interface and the processing unit or even integrated into the processing unit. The role of the processing unit controller 253 is to pilot the processing unit and to set its parameters to suit the content of the configuration that is imposed on it. The controller 253 may also obtain in return information on the progress of the processing underway or receive interruptions from the unit 230.

The input communication controller 251, the output communication controller 252 and possibly the processing unit controller 253 are piloted by the local controller 270. In FIG. 2 the control lines are shown by a thick dotted line. The local controller receives from the management configuration unit 260 the values of the parameters of the current configuration to be applied (or the configuration contents). These values are used to configure:

(a) the input communication controller 251, for example the identities of the emitting resources and, for each of them, the total amount of credits to be attributed to it as well as the quantum of credits to be transmitted;

(b) the output communication controller 252, for example the identities of the destination resources;

(c) the processing unit 230, for example its operating mode. If the controller 253 is present the processing unit 230 is configured via it.

The management configuration unit 260 receives from the central controller, during the initialisation phase of a task that the resource has to carry out, all of the configuration contents necessary to run this task.

The semi-distributed control system on chip that we have just described does not have the high latency times inherent to centralised control systems. It does comprise however a certain number of disadvantages.

Firstly, all of the configuration contents concerning a task that the resource has to carry out are stored locally. If the task to be carried out by the resource is complex, the memory of the management configuration unit 260 may be large in size. Then, during a configuration command incorporated into a data packet, it is possible that the required configuration is not present in the management configuration unit. There then occurs a blocked situation that can only be resolved by the intervention of the central controller. In the applications where the data flow undergoes several division-marging steps, then tasks have to be planned that only have a low time granularity. This blocked situation can then be repeated frequently and lead to unacceptable latency times.

The purpose of this invention is to overcome the above mentioned disadvantages, that is to say to propose a semi-distributed control system on chip that does not require a large storage memory in the network interfaces, whilst greatly limiting the occurrence of blocked situations.

DESCRIPTION OF THE INVENTION

This invention is defined by a network interface for network on chip adapted to interface a data processing unit with said network, wherein said interface and/or said processing unit can be configured using a plurality of configurations, wherein the network interface comprises a local controller adapted to configure said interface and/or said processing unit to said configurations via configuration contents, each configuration content defining a communication configuration of the interface and/or an operating configuration of the processing unit and wherein each configuration is indexed by an index. The network interface comprises a management configuration unit including a client module adapted to:

transmit via said network, when the content of a configuration is not available in said interface, a request whose argument is the index of the unavailable configuration;

receive via said server configuration network the content of said unavailable configuration;

deliver to the local controller the content of the configuration thus received.

The invention is also defined by a system on chip comprising a network on chip itself composed of routers connected to one another by means of physical connections, a plurality of network interfaces each associated to a processing unit, a central controller adapted to control the running of a task via said network interfaces and/or said processing units, in which:

each processing unit is connected to said network by a network interface as defined above;

at least one configuration server is connected to said network, wherein said server is adapted to transmit, on request from a network interface whose argument is a configuration index, a response to said interface including the configuration content matching said index, wherein said content permits the network interface to configure at least one element of said interface and/or the associated processing unit to run said task.

The invention also relates to a server for such a system on chip, comprising a memory adapted to store the configuration contents of the possible configurations of the network interfaces of said plurality of interfaces or of said sub-assembly of this plurality as well as the configuration contents of the possible configurations of the associated processing units, wherein said server is moreover adapted to analyse a request emitted by a network interface whose argument is a configuration index, to determine from said index the identity of the emitting network interface, to extract from said memory the configuration content concerning the configuration indexed by this index and to return to said emitting network interface said configuration content.

The invention also relates to a mobile terminal or a base station comprising a base band modem implemented by the system on chip as defined above.

The invention finally relates to a process for running a task via a network interface and/or its associated processing unit belonging to a system on chip as defined above:

transmission by the central controller to said network interface of a sequence of indices, wherein each index is representative of a configuration of said network interface and/or of its associated processing unit;

for each unavailable configuration content in said interface, transmission by the interface of a request to the configuration server (495) whose argument is the index of the unavailable configuration;

reception by said interface of each unavailable configuration content returned by the server;

running by said interface, and/or its associated processing unit, of configurations indexed by said indices in the order of said sequence, wherein a configuration is only run once its content is available in the interface and the running of the previous configuration has been completed.

BRIEF DESCRIPTION OF THE DRAWINGS

Other characteristics and advantages of the invention will become clear upon reading a preferred embodiment of the invention, made in reference to the appended figures in which.

DETAILED DESCRIPTION OF SPECIFIC EMBODIMENTS

The basic idea of the invention is to move the storage of the configuration contents outside of the network interfaces and to group them in one or more configuration servers.

Figure 4:
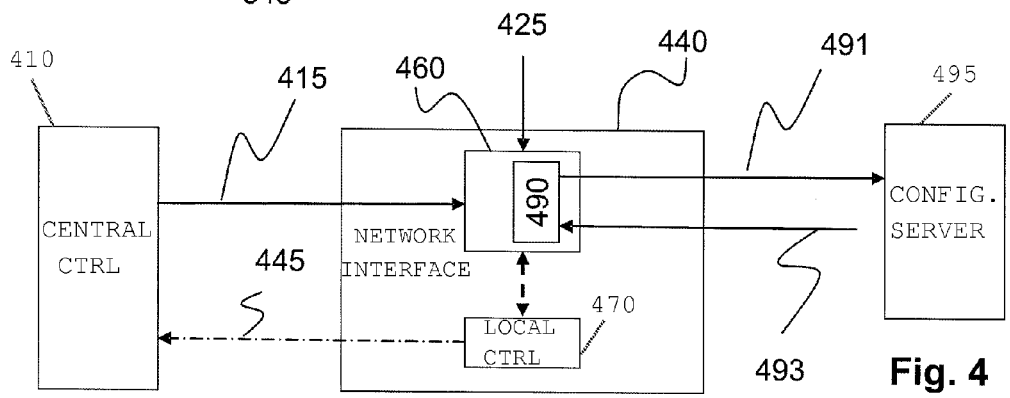
FIG. 4 illustrates the operation of a system on chip using semi-distributed control of the invention.

FIG. 4 illustrates diagrammatically the operating mode of a system on chip using a configuration server 495. The system on chip also comprises a central controller 410 and a plurality of processing units connected to the network via network interfaces. For reasons of simplification, a single network interface 440 has been shown and the associated processing unit has been omitted.

As seen previously, a reconfiguration of the interface and/or the associated processing unit may be made using two distinct modes: an explicit mode in which the central controller indicates directly to the interface 440 the configuration or the sequence of configurations to be adopted and an incorporated command mode where a data packet received indicates (by means of a label 425 in its header) the configuration or the sequence of configurations to be adopted to process it.

Figure 3:
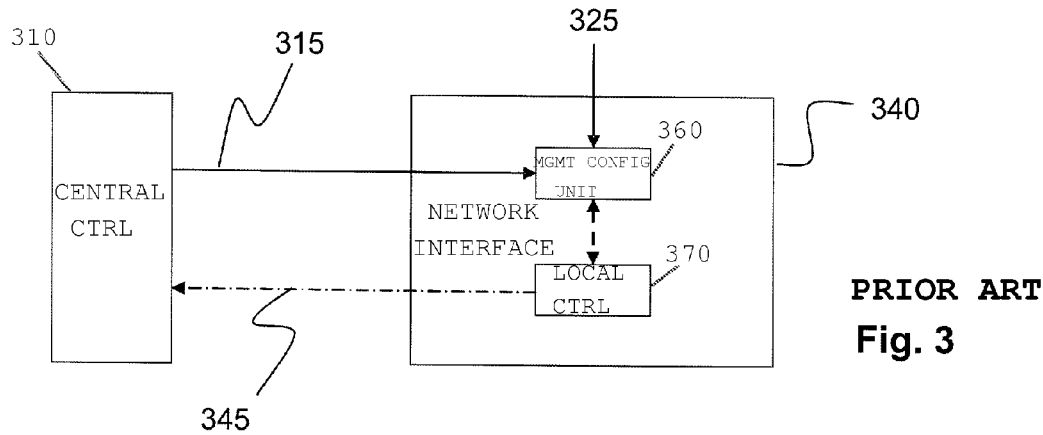
FIG. 3 illustrates the operation of a system on chip using a semi-distributed control that is known in the state of the art.

A major difference with FIG. 3 however, is that the central controller does not supply the interface with the configuration contents, that is to say the values of the parameters used to configure the communication controllers and the processing unit, neither in the initialisation phase of a task, nor later if a configuration is unavailable in an network interface.

To do so, the possible configurations of the various resources are indexed using indices. The indices of the configurations as well as their respective contents are stored in a single server or in a plurality of servers distributed throughout the network as we will explain below. The indices of the configurations advantageously have a composite structure. More precisely, the indices may comprise several fields or sub-indices:

A field identifying the resource to which the configuration applies;

An optional field identifying the context of use of the resource. For example if the system uses a base band modem of a multi-standard terminal, the context of its use could be the standard used;

A field identifying the element of the resource to which the configuration applies, for example the input communication controller, the output communication controller, the processing unit;

A field identifying the configuration itself for said element.

When the central controller wants to impose a configuration or a sequence of configurations to a resource, it transmits in 415 to the network interface the corresponding index or the sequence of indices. Advantageously, in order to reduce the quantity of information transmitted on the network, the configuration sequences may themselves be indexed in a tree structure, so that only the index of the sequence of configurations will be transmitted to the interface. If a sequence of configurations consists of a repetition of a configuration or an elementary sequence of configurations, the central controller transmits the index of said configuration or of said complementary sequence, along with the number of times that it has to be run.

Similarly, for a command incorporated into a data packet, the header will contain a label 425 providing the index of the configuration or the sequence of configurations to be adopted to process the data of this packet.

In either mode, for a given index, the management configuration unit 460 checks if the content of the configuration or the sequence of configurations is present in its local memory. For this purpose, the management configuration unit 460 checks if the index in question is present in its index list. The index list is updated when a configuration content is stored in the memory or is erased.

If the index is present in the index list, the management configuration unit 460 provides the corresponding configuration content to the local controller responsible for configuring the communication controllers accordingly.

If the index is absent from the index list, a client module 490 of the management unit 460 transmits, via the network, a request 491 to the configuration server 495. The request contains as an argument the index in question. The configuration server 495 then returns to the client module 490 of the requesting resource, a response 493 comprising the content of the configuration corresponding to the index. The identity of the requesting resource is determined from the resource field of the index. Upon reception of the response, the management configuration unit 460 updates its index list, stores the content of the configuration in its memory then supplies it to the local controller as previously. The memory of the unit 460 is for example organised in FIFO form so that the oldest configuration contents are erased progressively as the more recent configurations contents are stored. Alternatively or cumulatively, the memory may be divided into two parts, wherein each part has a FIFO structure, wherein the first part is dedicated to the common configurations, and the second to the more uncommon configurations, so that a rare configuration cannot erase a common configuration. In general, the memory of the unit 460 acts as a memory cache. It stores locally in the interface 440, the most common and/or the most recent configurations in the mass memory of the server 495. This memory is also associative in that a configuration content is searched using its index.

In the operation that we have just described, it can be seen that the central controller is not interrupted when a configuration is unavailable in a network interface of the system. However, if this occurs, the interface 440 transmits an interruption 445 to the central controller to advise that a task is complete.

As already mentioned, one or more configuration servers may be provided in the system on chip. This/these server(s) are specific processing units. When several servers are present, their respective fields of competency are distributed according to at least one of the following methods:

Geographical competence: the various servers take charge of different geographical zones of the chip;

Functional competence: the various servers take charge of different functions of the system. For example, if the system implements an emission/reception module, a first server may be competent for the configuration of the resources of the emitter and a second server may be competent for the configuration of the resources of the receiver;

Hierarchical competence: a main server receives all of the requests and redirects them according to their type to secondary configuration servers.

In one specific but non preferred embodiment, the configuration server is integrated into the central controller. However, a major difference with the prior art is that the configuration contents are not supplied upon interruption from the central controller but on request from the client module of a network interface made to the configuration server.

The/each configuration server processes the requests as they are received. It may have to store the requests in a FIFO buffer, for the time required to respond to a pending request. In the event of saturation of the buffer, it sends a negative acknowledgement packet (HACK) to the resource submitting the request to advise it that its request could not be satisfied and that it must send it again later.

Figure 5A:
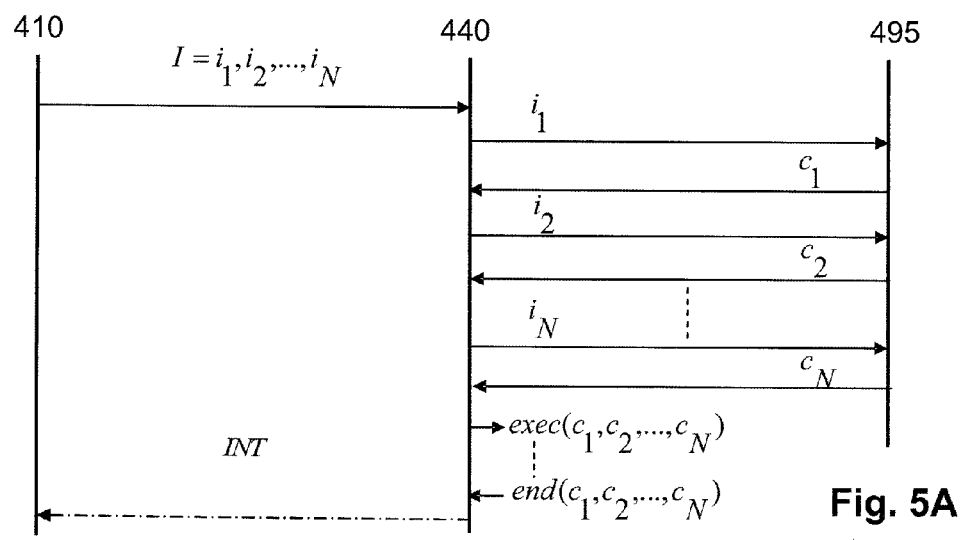
FIGS. 5A to 5C show configuration change chronograms.
Figure 5B:
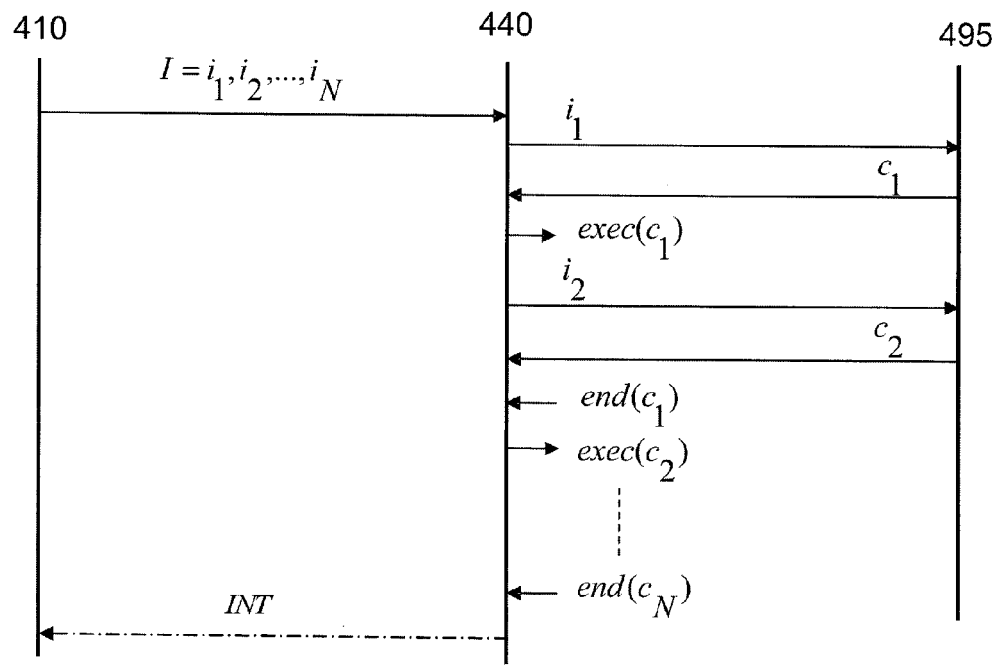
Figure 5C:
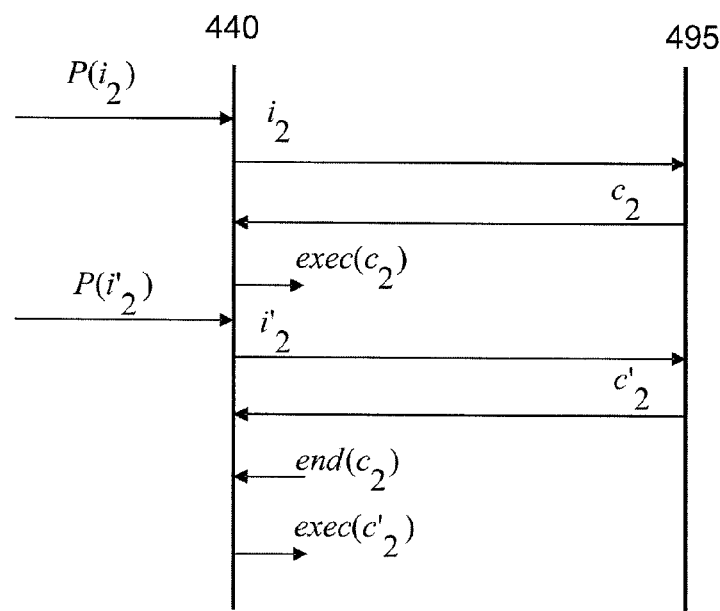

FIGS. 5A to 5C show configuration change chronograms within the scope of the system shown in FIG. 4.

FIGS. 5A and 5B concern configuration changes on explicit command from the central controller.

In the example illustrated in FIG. 5A, the central controller 410 imposes a sequence of index configurations $i_1, i_2, \ldots, i_N$ on the resource corresponding to a given task. For reasons of simplification, we can suppose that the memory of the management configuration unit is empty. The client module of the network interface then successively sends the respective argument requests $i_1, i_2, \ldots i_N$ to the configuration server that returns to it the configuration contents $c_1, c_2, \ldots, c_N$. In this embodiment, the management configuration unit waits until it has all of the configurations contents before supplying them to the local controller. The latter then runs the sequence of configurations in the order indicated. The index configuration $i_1$ corresponds for example to a configuration of the input communication controller for the reception of data from an emitting resource. The index configurations $i_2, \ldots i_{N-1}$ correspond for example to configurations of the processing unit. The index configuration $i_N$ corresponds for example to a configuration of an output communication controller for the transmission of the data processed to a destination resource.

After the task in question has been run, the network interface advises the central controller by means of an interruption INT.

In the example shown in FIG. 5B, the same sequence of indices $i_l, i_2, \ldots, i_N$ is sent via the central controller 410 to the network interface 440. By contrast with the previous example however, as soon as the first configuration content $c_l$ is received, the local controller runs it. While it is being run, the management configuration unit pre-fetches an argument request $i_2$ to the configuration server. As soon as the index configuration $i_1$ has ended (end($c_1$)) and the content is available, the index configuration $i_2$ is applied by the local controller. The requests are launched in turn without waiting for the end of the previous configuration being run. As in the previous example, when the last configuration of the task has ended (end($c_N$)), an interruption INT is sent to the central controller.

FIG. 5C illustrates the case of configuration commands incorporated into successive data packets $P(i_2)$ and $P(i'_2)$. It is supposed that the configurations of indices $i_2$ and $i'_2$ are configurations of the processing unit and that the packet $P(i'_2)$ is received during the processing of the packet $P(i_2)$. As in the example of FIG. 5B, the network interface launches (if the configuration is unavailable) a request being $i'_2$ as argument before the configuration bearing index $i_2$ has ended (pre-fetching). When it has ended, ($c_2$), the configuration bearing index $i'_2$ is in turn run.

Figure 1:
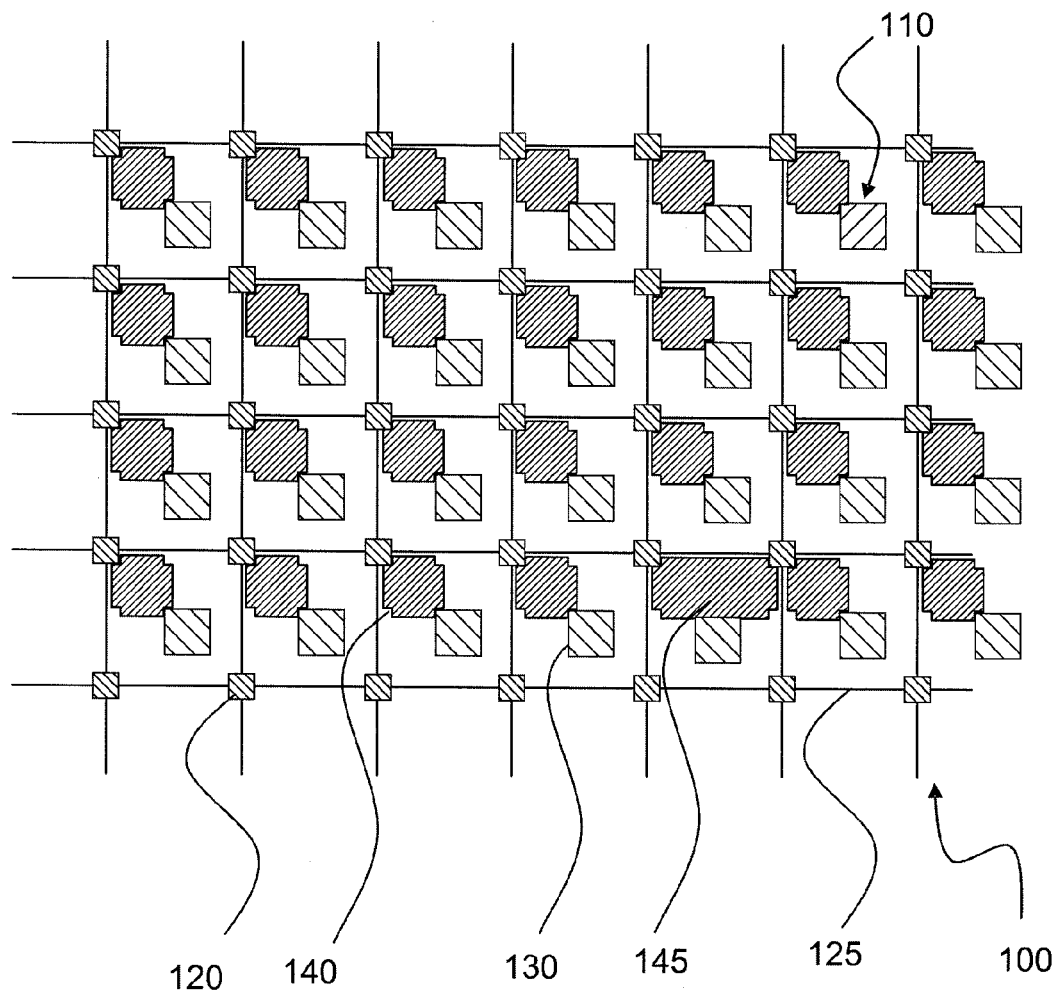
FIG. 1 shows diagrammatically a system on chip of the state of the art.
Figure 2:
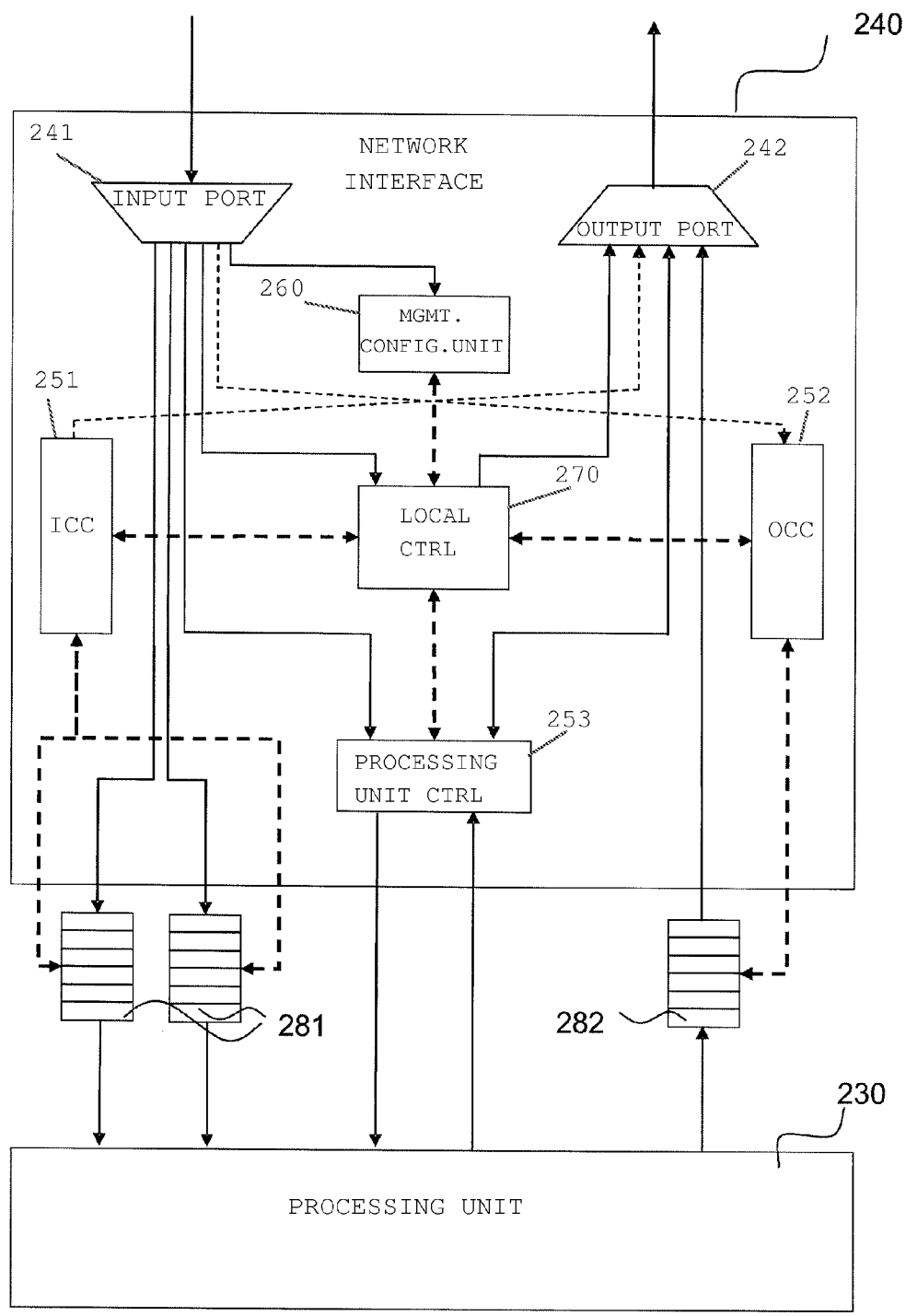
FIG. 2 shows diagrammatically a known network interface structure associated to a processing unit.
Figure 6:
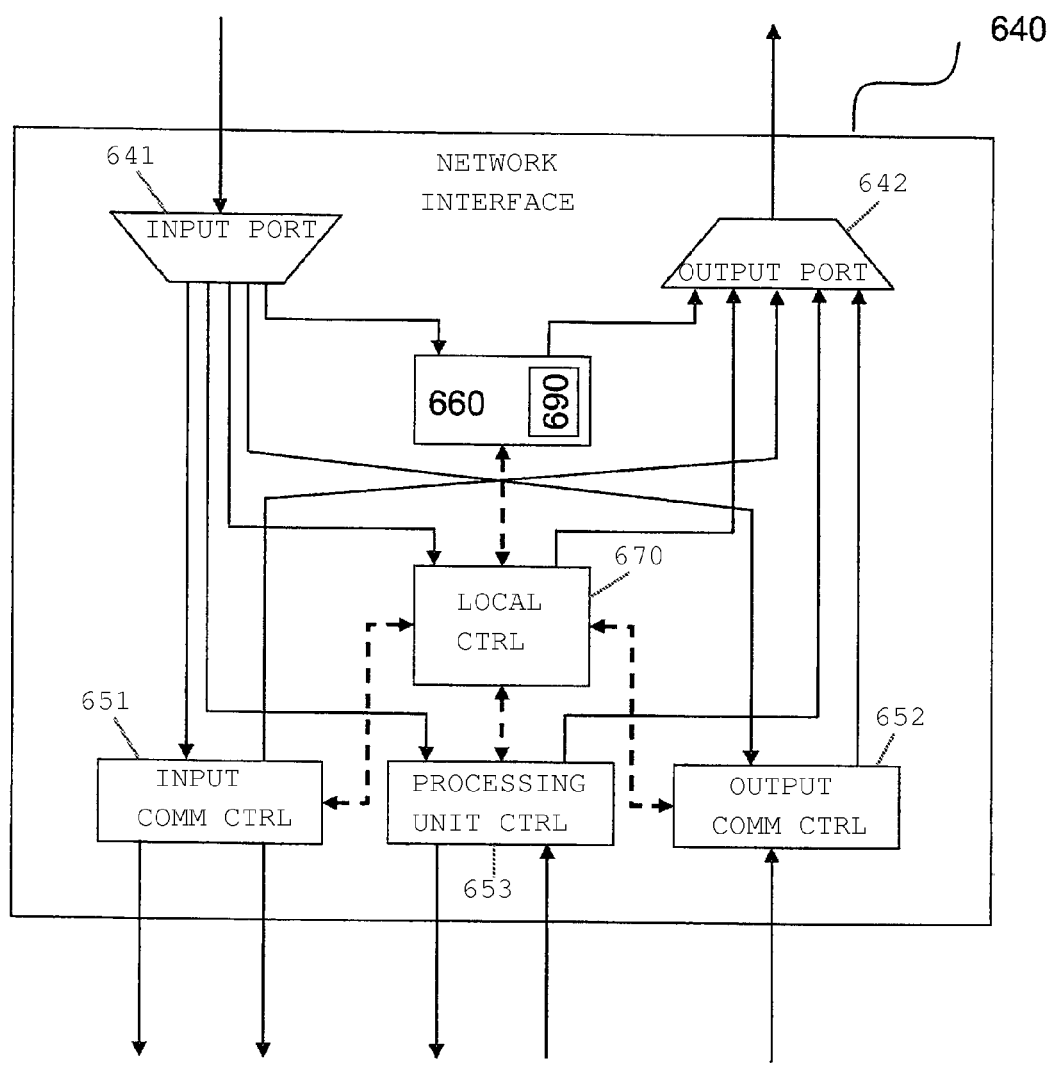
FIG. 6 shows the structure of an network interface in one embodiment of the invention.

FIG. 6 shows the structure of a network interface 640 according to an embodiment of the invention. We can distinguish an input port 641, an output port 642, an input communication controller 651, an output communication controller 652, and an optional processing unit controller 653. Apart from the following remarks, these elements are identical to those of FIG. 2.

To simplify things, the buffers (shown by references 281 and 282 in FIG. 2) controlled by the input and output communication controllers 651 and 652 have been shown as if they were integrated into them. In this way, we can remark that the data flow from the input port 641 destined for the processing unit pass via the input communication controller 651. Similarly the data from the processing interface and destined for a receiving resource passes via the output controller 652. In one variant of the embodiment, this simplified representation is also a true representation. Indeed in this variant, the input communication controller 651 is capable of carrying out demultiplexing, decapsulation and/or concatenation operations. Similarly, the output communication controller 652 is capable of carrying out multiplexing, segmentation and/or encapsulation operations on the data before transmitting on the network.

The network interface 640 also comprises a management configuration unit 660 connected to the input port 641 and the output port 642. The various controllers as well as the management unit 660 are controlled by the local controller 670, which may for example be a micro-sequenced unit.

The management configuration unit comprises a client module 690 (identical to the client module 490 already described) adapted to transmit requests to the configuration server(s) and receive the configurations contents requested.

FIGS. 7A to 7D show variants of the embodiment of a network interface of the invention. In these figures, elements with the same reference sign are identical. To make the figures easier to read, the connections between the controllers 751, 752, 753, on the one hand and the input 741 and output 742 ports on the other hand have been omitted.

Figure 7A:
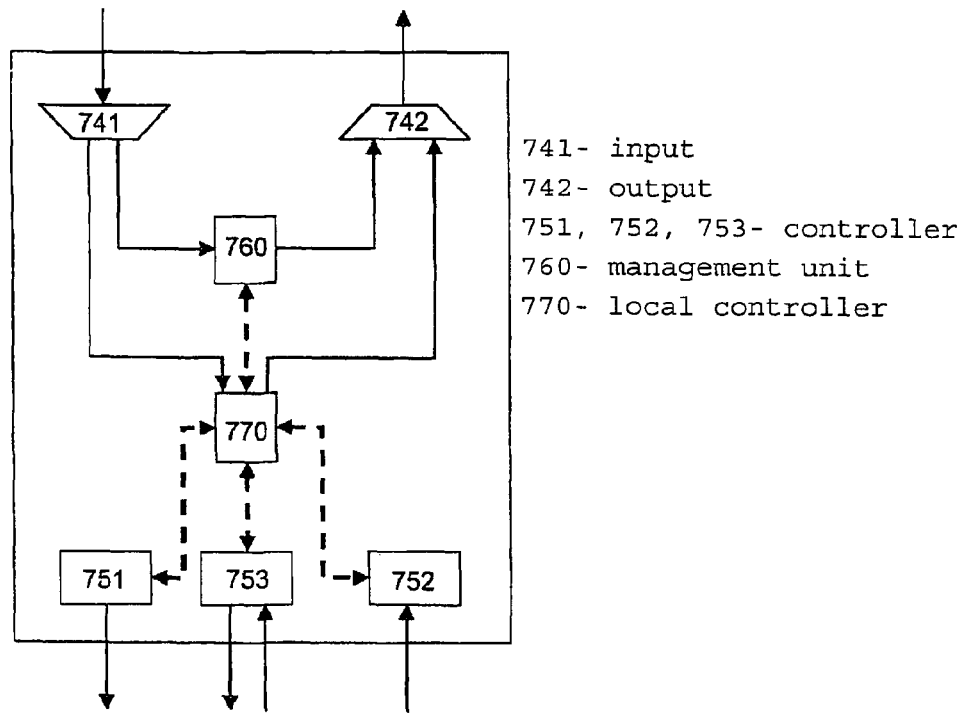
FIGS. 7A to 7D show the structure of an network interface according to various embodiment variants of the invention.
Figure 7B:
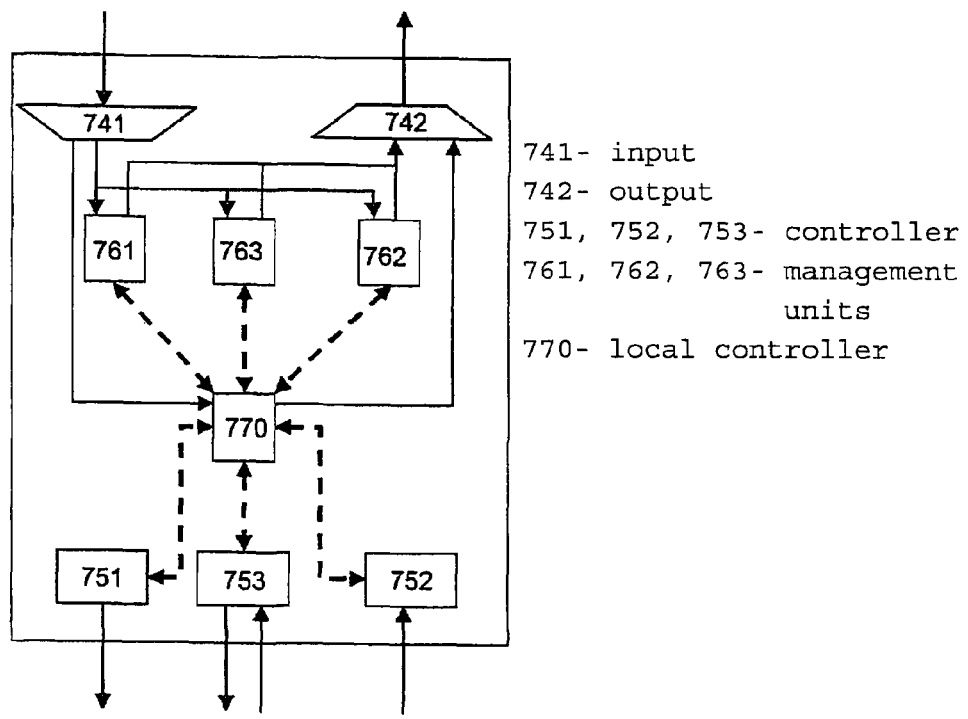
Figure 7C:
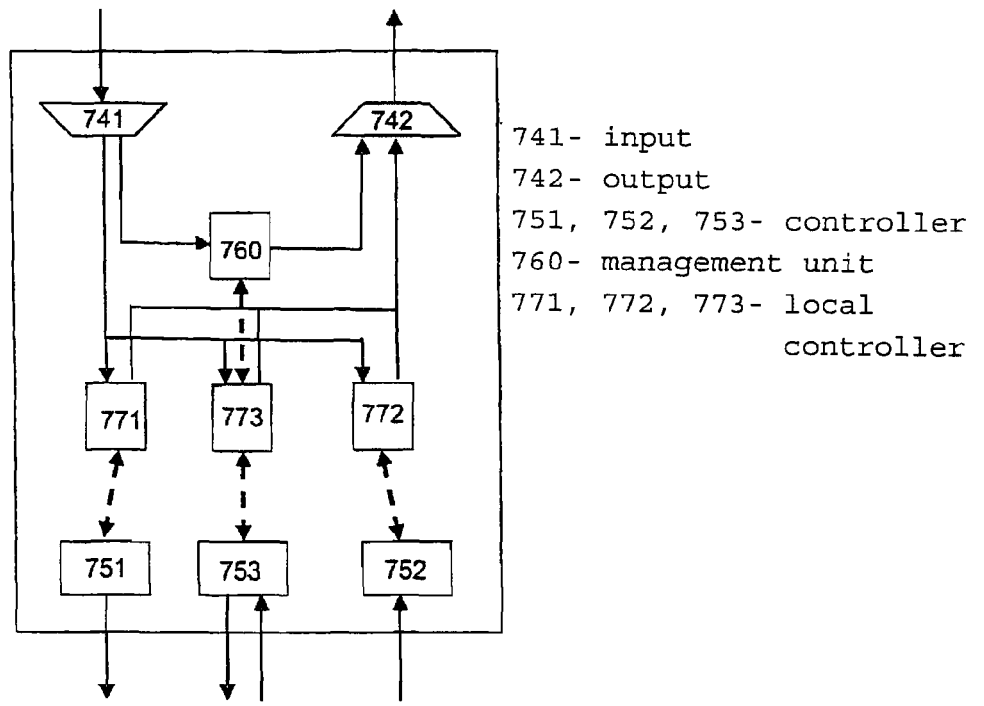
Figure 7D:
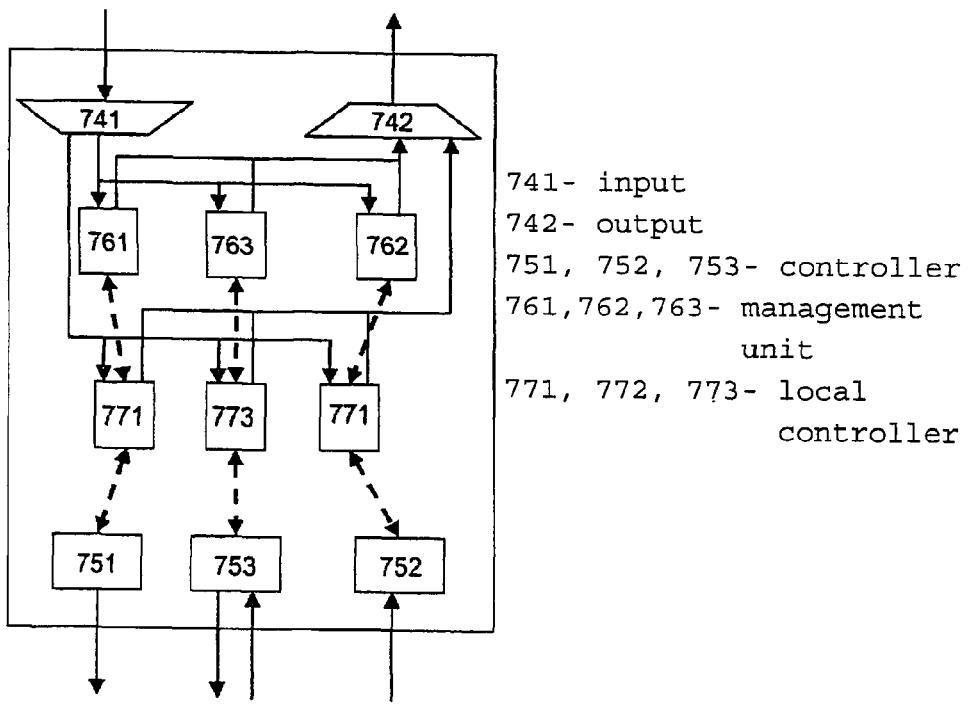

In order to facilitate the comparison, the network interface of FIG. 6 has been used in FIG. 7A. It can be noted that the variant of the embodiment of FIG. 7B is distinguished from that of FIG. 7A in that the management unit 760 is divided into distinct elementary management units 761, 762, 763 designed to manage the respective configurations of the controllers 751, 752 and 753, wherein each elementary management unit comprises a client module (not shown). When the controller 753 is absent, the management unit 763 manages the processing unit configuration directly. The variant of embodiment shown in FIG. 7C is distinguished from that of FIG. 7A in that the local controller 770 is divided into distinct elementary local controllers 771, 772, 773 which respectively configure and pilot the controllers 751, 752 and 753. The variant of FIG. 7D combines both distinct elementary management units as per FIG. 7B and distinct elementary local controllers as per FIG. 7C.

The system on chip of the invention may be used in particular to implement a base band modem of a mobile terminal that can be configured by software (software radio), especially that can handle different mobile telephone standards 3G (DS-CDMA) and/or 4G (MC-CDMA or even MIMO MC-CDMA).

For a MC-CDMA modem, the processing units may be, for example:
  for the emission: a channel encoder, a binary symbol modulator, a spectral spread module, an OFDM modulator;
  for the reception: a temporal and frequency synchro corrector, an OFDM demodulator, a channel estimator, an equalizer, an anti-spectral spread module, a binary symbol demodulator and a channel decoder.

Similarly, the system on chip of the invention may also be used to implement a base band modem of a base station that can be configured by software.

The invention claimed is:

1. System on chip comprising, integrated on a single chip:
  a network having routers connected to one another by means of physical connections;
  a plurality of processing units and a plurality of network interfaces, each network interface being associated to a processing unit, each processing unit being connected to at least a router of said network via an associated network interface interposed between said router and said processing unit, said each network interface and said each processing unit being able to be configured into a plurality of configurations;
  a central controller that controls the running of a task by said network interfaces or said processing units, the central controller synchronizing operations of the plurality of processing units in running the task by transmitting corresponding indices to the plurality of network interfaces;
  a configuration server connected to said network;
  at least one network interface comprising a local controller that configures said network interface and said processing unit into said configurations by means of configuration contents, wherein each configuration content defines a communication configuration of the network interface or an operating configuration of the processing unit, each configuration being indexed by a respective index of said indices;
  said network interface further comprising a configuration management unit including a client module that:
    checks whether the content of a configuration is absent from a local memory of the network interface;
    transmits a request to said configuration server, via said network, when said content of a configuration is unavailable in said network interface, wherein said request has for argument the index of the unavailable configuration,
    receives, via said network, from said configuration server, the content of said unavailable configuration;
    provides the local controller with the content of the configuration thus received to configure at least one element of said network interface or the associated processing unit to run said task;
  said server transmits, upon said request, a response to said network interface including the configuration content corresponding to said index.

2. System on a chip according to claim 1, wherein the configuration management unit comprises an associative memory that stores the respective contents of the available configurations as well as the indices of these configurations.

3. System on a chip according to claim 1, wherein the configuration management unit comprises a plurality of elementary management units, wherein each elementary management unit manages the configuration of an element or a plurality of elements of the network interface or manages the configuration of said processing unit.

4. System on a chip according to any one of claims 2, 3 and 1, wherein the local controller comprises a plurality of elementary local controllers, wherein each local controller controls an element or a plurality of elements of the network interface.

5. System on a chip according to claim 3, wherein one of said elements is an input communication controller that attributes transmission credits to an emitting resource or a plurality of emitting resources connected to said network.

6. System on a chip according to claim 3, wherein one of said elements is an output communication controller that transmits to a destination resource or a plurality of destination resources data issued from the processing unit according to the transmission credits that have been attributed to it/them respectively.

7. System on a chip according to claim 1, wherein the client module of the configuration management unit transmits a request whose argument is the index of an unavailable configuration in the network interface while the local controller configures said network interface or said processing unit to a configuration that has previously been transmitted to it by said configuration management unit.

8. System on a chip according to claim 1, wherein each configuration index comprises:
- a field identifying said network interface to which said configuration applies, from a plurality of network interfaces;
- a field identifying the element of the interface or the processing unit to which said configuration applies; and
- a field identifying said configuration from a plurality of possible configurations of said element or of said processing unit.

9. System on a chip according to claim 8, wherein said configuration index also comprises a field identifying a context of use of the processing unit in which it is applied.

10. System on chip according to claim 1, wherein it comprises a plurality of configuration servers, wherein each server is competent to respond to requests issued from network interfaces belonging to a distinct sub-assembly of said plurality of network interfaces.

* * * * *